US010360715B2

(12) United States Patent
Tsuda et al.

(10) Patent No.: US 10,360,715 B2
(45) Date of Patent: Jul. 23, 2019

(54) STORAGE MEDIUM, INFORMATION-PROCESSING DEVICE, INFORMATION-PROCESSING SYSTEM, AND AVATAR GENERATING METHOD

(71) Applicant: NINTENDO CO., LTD., Kyoto (JP)

(72) Inventors: Munetaka Tsuda, Kyoto (JP); Akihiro Umehara, Kyoto (JP); Yui Iida, Kyoto (JP); Masayuki Okada, Kyoto (JP); Hayuru Soma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 309 days.

(21) Appl. No.: 14/745,974

(22) Filed: Jun. 22, 2015

(65) Prior Publication Data

US 2016/0217601 A1    Jul. 28, 2016

(30) Foreign Application Priority Data

Jan. 23, 2015  (JP) .................................. 2015-11148

(51) Int. Cl.
*G06T 13/80* (2011.01)
*H04N 5/232* (2006.01)
(Continued)

(52) U.S. Cl.
CPC ............ *G06T 13/80* (2013.01); *A63F 13/655* (2014.09); *G06F 3/04842* (2013.01); *H04N 5/23229* (2013.01); *A63F 2300/5553* (2013.01)

(58) Field of Classification Search
CPC ........ A63F 2300/5553; A63F 2300/695; A63F 13/655; A63F 2300/8082; A63F 2300/308;
(Continued)

(56) References Cited

U.S. PATENT DOCUMENTS

2011/0122219 A1* 5/2011 Kim ....................... H04N 7/147
                                                                348/14.02
2014/0043424 A1* 2/2014 Gava .................. H04N 21/4126
                                                                348/14.01
(Continued)

FOREIGN PATENT DOCUMENTS

EP          2 581 881        4/2013
JP       2007-049654 A       2/2007
(Continued)

OTHER PUBLICATIONS

Nancy Owano, Intel brings out the avatar in you with new app, published at https://techxplore.com on Jun. 20, 2014, downloaded from https://techxplore.com/news/201406intelavatarapp.html on Aug. 18, 2017, 4 pages.*

(Continued)

*Primary Examiner* — Haixia Du
(74) *Attorney, Agent, or Firm* — Nixon & Vanderhye, P.C.

(57) ABSTRACT

An example information-processing device (10) includes an image capture unit (110) that captures a video of a subject, an image generation unit (120) that generates plural avatars based on plural images constituting the video captured by the image capture unit (110), the plural images corresponding respectively to different image capture timings, each of the plural avatars representing a subject shown in one of the plural images, and a display unit (130) that displays the plural avatars generated by the image generation unit (120).

22 Claims, 6 Drawing Sheets

(51) Int. Cl.
*A63F 13/655* (2014.01)
*G06F 3/0484* (2013.01)

(58) Field of Classification Search
CPC ........... G06T 13/40; G06T 2207/30201; G06T 13/80; G06T 2200/08; H04N 7/157; H04N 21/8146; H04N 21/4788; G06K 9/00268; G06K 9/00302; G06Q 30/0643; G06Q 30/0276; G06Q 30/0617; H04L 67/306; H04M 2203/1025; H04M 1/72544; H04M 2250/62; H04M 2201/42; G06N 3/006
See application file for complete search history.

(56) References Cited

U.S. PATENT DOCUMENTS

| | | | | |
|---|---|---|---|---|
| 2014/0085293 A1* | 3/2014 | Konoplev | ............... | A63F 13/12 345/419 |
| 2014/0129989 A1* | 5/2014 | Kim | ............... | G06F 3/0482 715/838 |
| 2014/0218371 A1* | 8/2014 | Du | ............... | G06T 13/80 345/473 |
| 2014/0221089 A1* | 8/2014 | Fortkort | ............... | G06F 17/30241 463/31 |
| 2014/0229850 A1* | 8/2014 | Makofsky | ............... | A63F 13/79 715/747 |
| 2015/0312523 A1* | 10/2015 | Li | ............... | H04M 1/72544 348/14.03 |
| 2015/0325029 A1* | 11/2015 | Li | ............... | G06T 13/40 382/103 |

FOREIGN PATENT DOCUMENTS

| | | |
|---|---|---|
| JP | 2008-287541 | 11/2008 |
| JP | 2014-170505 A | 9/2014 |
| WO | 2013/152454 | 10/2013 |

OTHER PUBLICATIONS

Extended European Search Report dated Jun. 22, 2016 issued in corresponding European Application No. 15172293.1 (10 pgs.).

Chi-Hyoung Rhee and Chang Ha Lee, "Cartoon-like Avatar Generation Using Facial Component Matching", International Journal of Multimedia and Ubiquitous Engineering, vol. 8, No. 4, Jul. 2013 (10 pgs.).

Office Action dated Mar. 21, 2017 in Japanese Application No. 2015-011148.

\* cited by examiner

| AVATAR | PART IMAGE | | | |
|---|---|---|---|---|
| | FACE FORM | EYES | NOSE | MOUTH |
| Av1 | P11 | P21 | P31 | P41 |
| Av2 | P12 | P22 | P32 | P42 |
| Av3 | P13 | P23 | P33 | P43 |
| Av4 | P14 | P24 | P34 | P44 |
| Av5 | P15 | P25 | P35 | P45 |

STORAGE MEDIUM, INFORMATION-PROCESSING DEVICE, INFORMATION-PROCESSING SYSTEM, AND AVATAR GENERATING METHOD

CROSS REFERENCE TO RELATED APPLICATIONS

The disclosure of Japanese Patent Application No. 2015-11148, filed on Jan. 23, 2015, is incorporated herein by reference.

FIELD

The exemplary embodiment relates to a technique for generating an avatar corresponding to a subject of a captured image.

BACKGROUND AND SUMMARY

Use of an avatar in online communication is common. An avatar typically represents an appearance of a user; however, an avatar may represent an appearance of another object such as another person, an animal, or an imaginary character. A user may use an avatar in communication, the avatar representing, for example, an appearance of a favorite public figure, a user's pet, or a game or cartoon character.

To use an original avatar, a user first needs to generate the avatar. Known in the art are techniques that can be employed by a user to generate an avatar, which include a method of capturing an image of a subject using a camera, and analyzing the captured image to generate an avatar. The technique enables a user to generate an avatar easily.

An exemplary embodiment provides a non-transitory storage medium storing a program for causing a computer to execute a process, the process including: causing an image capture unit to capture a video of a subject; generating plural avatars based on plural images constituting the video captured by the image capture unit, the plural images corresponding respectively to different image capture timings, and each of the plural avatars representing a subject shown in one of the plural images; and causing a display unit to display the generated plural avatars.

DETAILED DESCRIPTION OF NON-LIMITING EXAMPLE EMBODIMENTS

1. Exemplary Embodiment (1) Configuration

Figure 1:
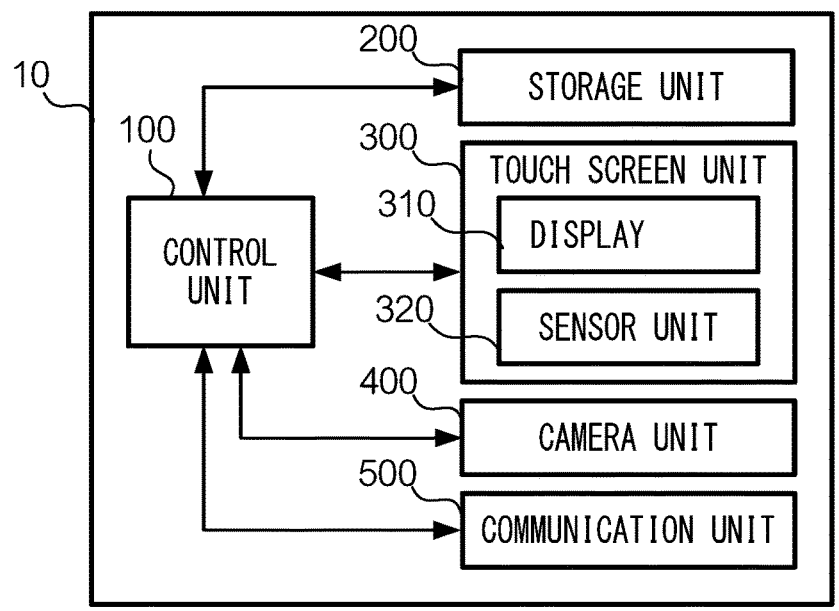
FIG. 1 shows an example of a hardware configuration of an information-processing device 10.

FIG. 1 is a block diagram showing a hardware configuration of information-processing device 10 according to the present exemplary embodiment. Information-processing device 10 is a computer device that captures an image of a subject and that can be used to assist a user in generating an avatar. Information-processing device 10, in the present exemplary embodiment, is a smartphone, which is a portable wireless communication device.

An avatar as used in the present exemplary embodiment refers to an image of a character representing a user's alter ego, or in other words an image of a character identifying a user. A character shown in an avatar according to the present exemplary embodiment may have an appearance of any character that enables other users to identify a user of information-processing device 10 based on the character. The character may have no resemblance to the user. With information-processing device 10, a user may capture an image of a subject such as himself/herself or another person, and obtain an avatar according to the captured image. A subject as used herein may be, for example, a figure displayed on a TV screen or a figure printed in a book. The subject may be an existent or non-existent figure.

A character shown in an avatar is a two-dimensional or three-dimensional character. A three-dimensional character may be represented by a combination of polygons using three-dimensional computer graphics (3DCG). An avatar according to the present exemplary embodiment is an image of a two-dimensional or three-dimensional character.

Information-processing device 10 includes control unit 100, storage unit 200, touch screen unit 300, camera unit 400, and communication unit 500. Information-processing device 10 may further include a speaker, a microphone, or a vibrator, in addition to the units shown in FIG. 1. Information-processing device 10 may still further include another input unit such as a keypad, in addition to touch screen unit 300.

Control unit 100 is a unit for controlling operations of components of information-processing device 10. Control unit 100 includes one or more processing units such as a central processing unit (CPU). The CPU may include an application processor, a baseband processor, and a graphics processing unit (GPU), which are built into a chip. Control unit 100 is capable of providing functions by executing an operating system (OS) or an application program. Control unit 100 includes a main memory.

Storage unit 200 is a unit for storing data. Storage unit 200 includes a storage medium such as a flash memory or a hard disk. Storage unit 200 stores items of image data for displaying an avatar, in addition to programs executed by control unit 100. Storage unit 200 may include a removable storage medium such as a memory card, and a reader/writer.

Touch screen unit 300 is a unit for displaying information and receiving a user's input operation. Touch screen unit 300, specifically, includes display 310 and sensor unit 320. Display 310 includes a display panel using liquid crystal elements or organic electroluminescence (EL) elements, which unit displays an image according to display data provided by control unit 100. Sensor unit 320 includes a sensor for detecting a position of an indicator, such as a user's finger or a stylus, on the display panel, which unit provides control unit 100 with coordinate data indicative of the detected position. The sensor may be a capacitance type touch sensor or any other sensor.

Camera unit 400 is a unit for capturing an image of a subject. Camera unit 400 includes at least one image sensor such as a complementary metal-oxide semiconductor (CMOS) image sensor, which unit provides control unit 100 with image data representing a captured image. Camera unit 400 may include plural image sensors. Camera unit 400 may, for example, include an image sensor provided on the front surface of information-processing device 10, on which surface display 310 is provided, and another image sensor provided on the back surface of the same device. Camera unit 400 may alternatively be a stereo camera, which simulates binocular parallax to capture a three-dimensional image.

The present exemplary embodiment assumes, as basic use of information-processing device 10, that a user captures an image of himself/herself using an image sensor provided on the front surface of information-processing device 10, while viewing display 310. When a user captures an image of another person, instead of himself/herself, s/he may capture an image of the person using an image sensor provided on the back surface of information-processing device 10. In such a case, information-processing device 10 may include only the image sensor provided on the back surface.

Communication unit 500 is a unit for exchanging data. Communication unit 500 includes an antenna and exchanges data with another device via a network. Communication unit 500 may alternatively perform communication using a predetermined wireless communication method such as infrared communication or near field communication (NFC), without a network, or may perform wired communication.

Figure 2:
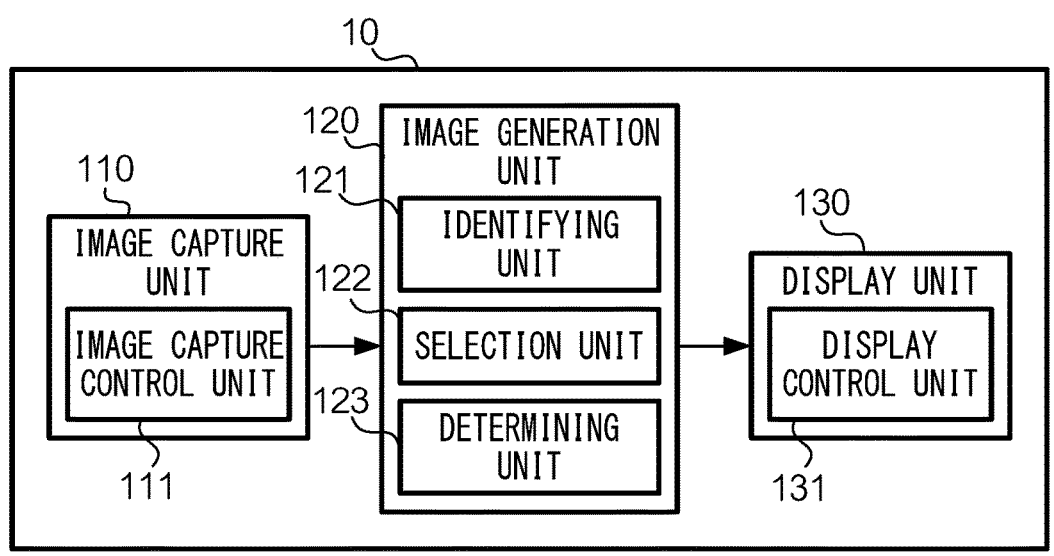
FIG. 2 shows an example of a functional configuration of an information-processing device 10.

FIG. 2 is a block diagram showing a functional configuration of information-processing device 10. The functions of information-processing device 10 are broadly divided into image capture unit 110, image generation unit 120, and display unit 130.

Image capture unit 110 is a unit for capturing an image necessary for generating an avatar. Image capture unit 110, specifically, includes image capture control unit 111. Image capture unit 110 is provided by cooperation of control unit 100 and camera unit 400. Image capture control unit 111 is a unit provided by control unit 100, which unit controls image capture of camera unit 400. Image capture control unit 111, for example, controls the start and end of image capture of camera unit 400.

Image capture unit 110 captures a video in accordance with a user's input operation in the present exemplary embodiment. A video as used herein refers to a set of still images, which are captured at a predetermined frame rate. Image capture unit 110 may capture a video over a predetermined time period, or over a time period specified via a user's input operation.

Image generation unit 120 is a unit for generating an avatar image. Image generation unit 120 generates plural avatars based on a video captured by image capture unit 110. Specifically, image generation unit 120 repeats an action a number of times, of generating one or more avatars based on a captured image, which captured image is a still image constituting a video captured by image capture unit 110, and which has been captured at a predetermined image capture timing. By the repeated actions, image generation unit 120 generates an avatar based on each of plural captured images constituting the video captured by image capture unit 110, the captured images corresponding respectively to different image capture timings. Image generation unit 120, specifically, includes identifying unit 121, selection unit 122, and determining unit 123. Image generation unit 120 is provided by control unit 100.

Identifying unit 121 is a unit for identifying features corresponding to a face in a captured image. The features may include a position, a shape, or a color of parts of a head such as ears, eyes, eyebrows, a nose, or a mouth. The facial features may further include a face form, facial contours, and a hairstyle, and may reflect presence or absence of eyeglasses or a beard.

Identifying unit 121 may identify a face in different manners. Identifying unit 121 may, for example, use a commonly known facial recognition technology to detect a part equivalent to a human face in a captured image. The part will be hereinafter referred to as "face image." On detecting the face image, identifying unit 121 identifies plural feature points included in the detected face image to classify features of facial parts. Identifying unit 121, for example, identifies plural feature points of a part equivalent to an eye, such as left, right, top, and bottom end points, to identify a feature of the eye, such as an upturned eye or a downwardly slanting eye, based on a positional relationship of the identified feature points. Identifying unit 121 is able to identify or classify a feature of parts other than an eye in a similar manner.

A captured image may include no face image, or a motion blur may occur, which may cause identifying unit 121 to fail to identify a face image. When having failed to detect a face image, identifying unit 121 may try again to identify a face image in another captured image, which may include a captured image one to several frames subsequent to a captured image that has caused a failure in detecting a face image.

Selection unit 122 is a unit for selecting a part image. A part image as used herein is an image pre-assigned to each of facial parts, which is prepared for each feature of a facial part. Selection unit 122 retrieves data representing part images from storage unit 200 to select a part image according to a feature identified by identifying unit 121. A part image may be a bitmapped image or a vector image.

Determining unit 123 is a unit for determining a color of at least a part of an avatar. Determining unit 123, for example, determines a color of a skin or hair based on a captured image. Determining unit 123 determines, as a color of a target area included in a face image, a color according to a gradation value for the area, such as a gradation value of the RGB color system. Determining unit 123 may determine a color of a part image based on a captured image, for which there is no preset color.

Display unit 130 is a unit for displaying an image during or after generation of an avatar. Display unit 130, specifically, includes display control unit 131. Display unit 130 is provided by cooperation of control unit 100 and touch screen unit 300, or especially display 310. Display control unit 131 is provided by control unit 100, which controls display of an image on touch screen unit 300.

Display unit 130 displays plural avatars generated by image generation unit 120, which can be selected. A user may select a desired avatar from among the plural avatars displayed by display unit 130. The user may select the desired avatar, for example, by tapping the avatar.

Display unit 130 may scroll avatars for display when the number of the avatars is greater than that of display areas for an avatar. Display unit 130 may suspend scrolling avatars for display, or may scroll avatars backward, in response to satisfaction of a predetermined condition. Display unit 130 may, for example, suspend scroll display in response to suspension of generation of an avatar or to a user's predetermined input operation.

Display unit 130 may display a video being captured, as a live view image, in addition to avatars. Displaying a live video enables a user to use touch screen unit 300 just like a digital camera viewfinder, to check or adjust a camera angle and an appearance of a subject to be captured. It is to be noted that displaying a video on display 310 is optional.

(2) Operation

The foregoing is a description of a configuration of information-processing device 10. With thus configured information-processing device 10, a user is able to generate an avatar. A user may use a generated avatar in various ways. A user may, for example, use an avatar image as an image representing himself/herself in an online service such as a social networking service (SNS), or may use an avatar as a character appearing in a game. Information-processing device 10 may send avatar data to another device such as a game machine, or may encode the avatar data to display it as code data such as a QR code (registered trademark).

Information-processing device 10, which generates plural avatars based on a captured image to display them, is able to support a user in generating an avatar. Information-processing device 10, which generates plural avatars, is able to provide a user with more options than in a case where avatars are generated one by one.

Information-processing device 10, which generates plural avatars based on a video, corresponding respectively to different image capture timings, eliminates the need for a user's explicit instruction directed to information-processing device 10 to recapture an image. In other words, information-processing device 10 is able to provide a user with a number of avatars, without a user's instruction to recapture an image, in contrast to a case where an avatar corresponding to a particular image capture timing is generated.

Captured images of a subject can vary substantially due to a change in image capture conditions, as described above. In a case where a captured image shows a subject familiar to a user such as his/her face, s/he is likely to notice a difference between the subject shown by the captured image and a real subject. Consequently, generating an avatar based on a captured image may often produce a result that is unsatisfactory to a user.

A user who captures an image of a subject using information-processing device 10 according to the present exemplary embodiment, which is a portable electronic device, usually captures an image of a subject while holding information-processing device 10 in his/her hand. Holding information-processing device 10 in a hand makes unstable a positional relationship between information-processing device 10, a subject, and a light source, which may increase the probability that an angle between information-processing device 10 and the subject will change, or may increase the probability that a color of the subject shown in a captured image will change due to light reflected by the subject.

In the present exemplary embodiment, information-processing device 10, which generates plural avatars based on a video, corresponding respectively to different image capture timings, is able to generate avatars based on plural captured images, which have been captured under image capture conditions that vary slightly. A user is able to select a desired avatar from among avatars corresponding respectively to different image capture conditions, which makes it easier for a user to obtain a desired avatar.

Figure 3:
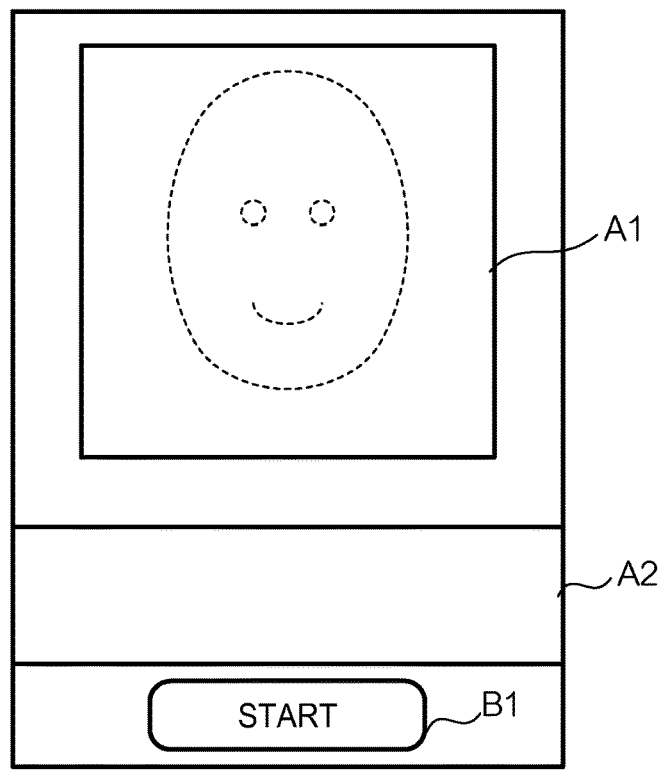
FIG. 3 shows an example of a display screen.

FIG. 3 is a diagram showing an example of a display screen of information-processing device 10, which is displayed when an avatar is generated. Information-processing device 10 is able to display such a screen by executing a predetermined application program. The exemplary display screen includes area A1 for displaying a live view image and area A2 for displaying avatars. The exemplary display screen also includes button B1. The display screen shown in FIG. 3 shows a situation where no avatar has been generated.

In area A1, a video being captured by camera unit 400 is displayed. In area A1, lines or marks may be displayed for adjusting positions of major facial parts such as a facial contour, eyes, a nose, or a mouth, which facilitates facial recognition. In area A2, avatars generated by information-processing device 10 are displayed. The display screen shown in FIG. 3 shows a situation where no avatar is displayed in area A2.

Button B1 is a button for giving an instruction to start or end generation of avatars. Button B1 shown in FIG. 3 functions as a button for starting generation of avatars. A user's tapping of button B1 causes information-processing device 10 to start a processing for generating avatars. A user may, for example, tap button B1 to start generation of avatars after adjusting his/her face position or posture relative to camera unit 400 with reference to a live video displayed in area A1. A user may also adjust his/her face position or posture relative to camera unit 400 with reference to a live video displayed in area A1, after tapping button B1.

Figure 4:
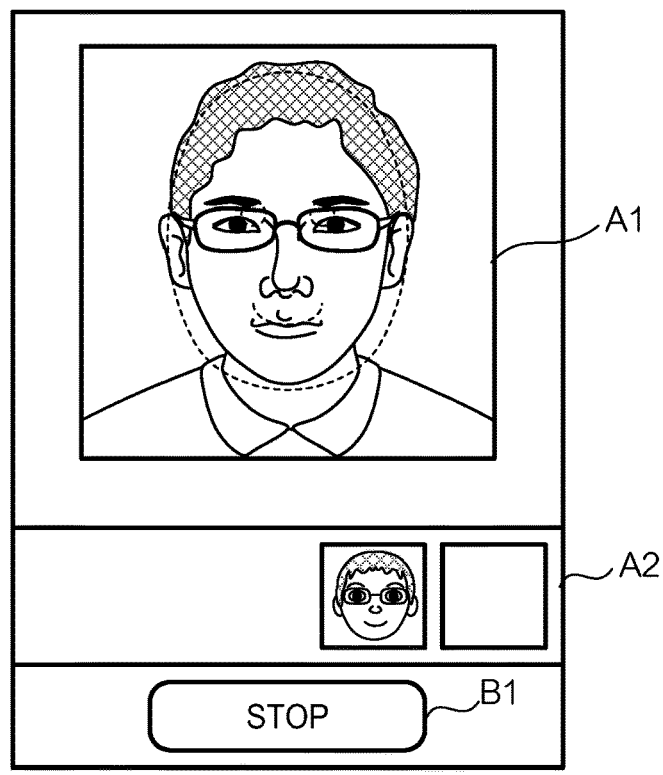
FIG. 4 shows an example of a display screen.
Figure 5:
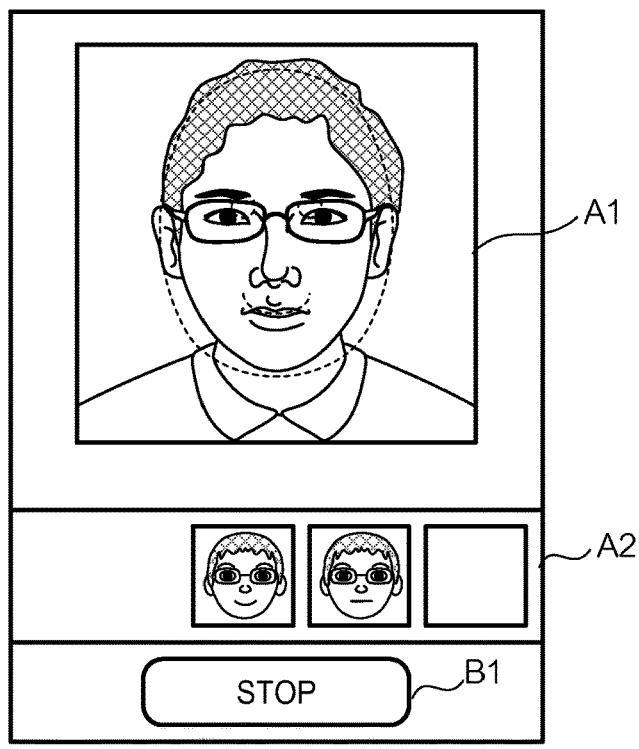
FIG. 5 shows an example of a display screen.

FIGS. 4 and 5 are diagrams showing an example of a display screen of information-processing device 10, which is displayed after commencement of generation of avatars. Information-processing device 10 displays an avatar in area A2 each time an avatar is generated. Information-processing device 10 updates display of area A2 at predetermined intervals. Information-processing device 10 sequentially generates and displays a new avatar until a predetermined condition is satisfied. The display screen shown in FIG. 5 is an example of a display screen displayed a predetermined time after the display screen shown in FIG. 4 is displayed. When displaying the display screen shown in FIG. 5, information-processing device 10 scrolls avatars for display from right to left. Button B1 functions as a button for suspending or ending generation of avatars, after generation of avatars is started.

Avatars displayed in area A2 differ from each other in terms of a captured image based on which an avatar is generated or of part images constituting the avatar. The difference, in principle, makes the avatars different in appearance, although identical-looking avatars may be displayed in a case where two captured images that have been captured at different image capture timings are substantially similar to each other.

A user may select a desired avatar from among avatars displayed in area A2. A user may, as a typical example, select a desired avatar after suspending generation of avatars, or specifically tapping button B1. A user may alternatively select a desired avatar during generation of avatars. Information-processing device 10 displays an avatar edit screen in response to selection of an avatar. A user may suspend scroll display of avatars or scroll avatars backward by flicking or dragging area A2.

Figure 6:
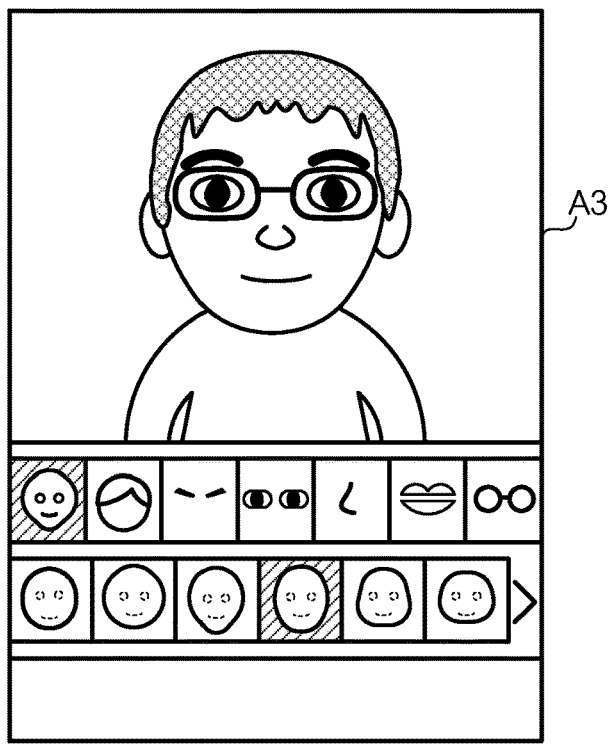
FIG. 6 shows an example of an avatar edit screen.

FIG. 6 is a diagram showing an example of an avatar edit screen, whereby a user is able to edit an appearance of an avatar. An edit as used herein may include, for example, changing a position or color of a facial part, or changing a part to another. The edit may further include changing an aspect ratio, size, or magnification of a part, or rotating a part.

On the edit screen a user selects a part to be edited. FIG. 6 shows a case where a face form has been selected from among seven parts including a face form, a hairstyle, eyebrows, eyes, a nose, a mouth, and eyeglasses. The edit screen shown in FIG. 6 enables a user to change a face form or color to another.

Area A3 shown in FIG. 6 is an area for previewing an avatar. Information-processing device 10 changes an avatar displayed in area A3, in accordance with a user's editing of an avatar. Information-processing device 10 ends editing of an avatar and saves avatar data in response to receipt of a user's predetermined input operation. Avatar data is data for specifying an appearance of an avatar, which may include, for example, items of identification data (ID) for identifying a part used in an avatar, and data indicative of colors and positions of parts. Avatar data may alternatively include image data representing an avatar.

To enable generation of an avatar described in the foregoing, information-processing device 10 executes a main processing, a face analysis processing, and a display processing, which are described below. Control unit 100 concurrently executes the three types of processing. The main processing is a principal processing relevant to generation of avatars. The face analysis processing is a processing relevant to analysis of a captured image. The display processing is a processing relevant to display of avatars. Control unit 100, if including plural processing units, may execute the three types of processing using different processing units.

Figure 7:
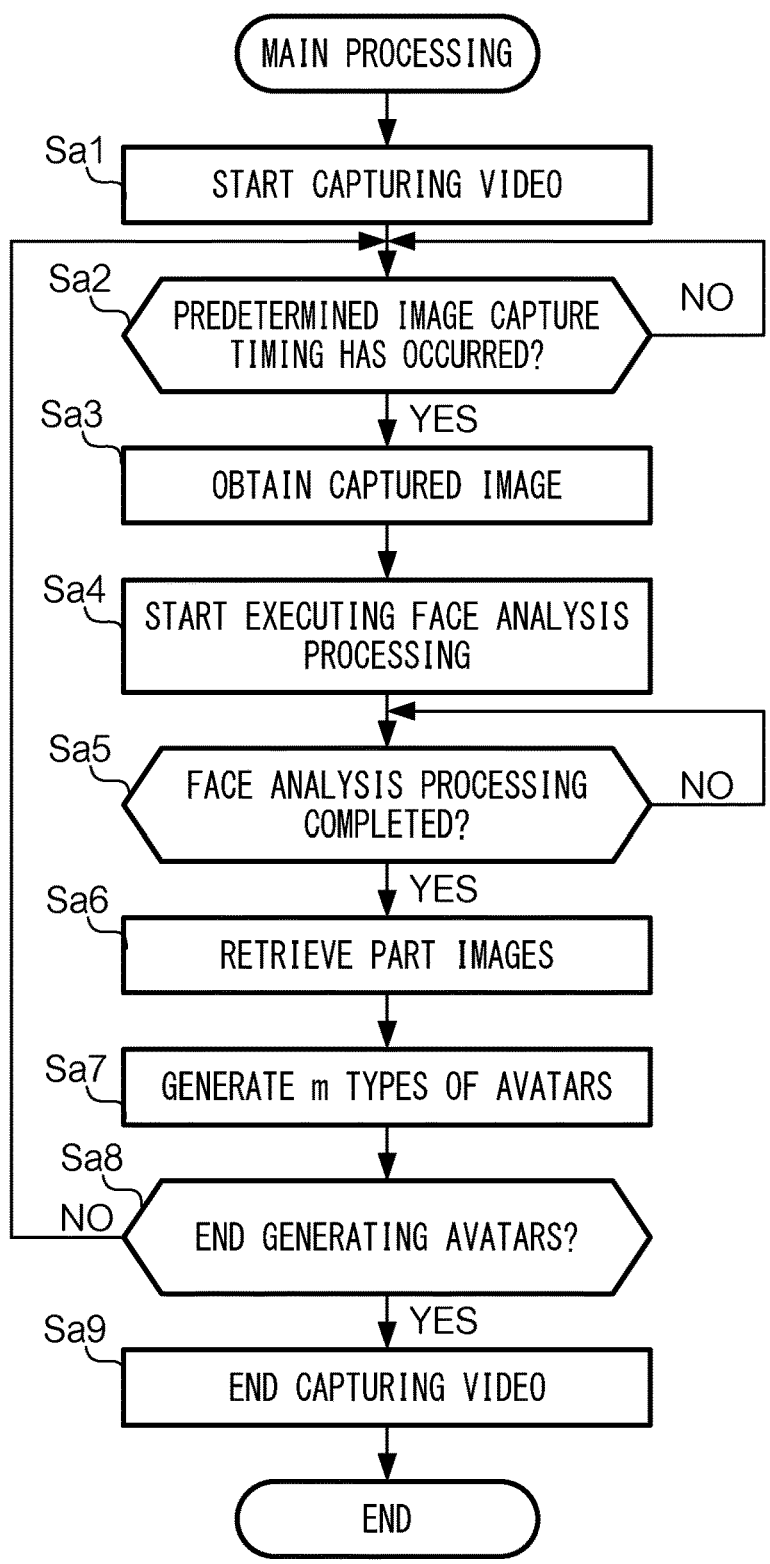
FIG. 7 shows an example of a flowchart illustrating a main processing.

FIG. 7 is a flowchart showing an example of a main processing. In the main processing, control unit 100 initially starts capturing a video in response to a user's input operation (step Sa1). Control unit 100, specifically, causes camera unit 400 to start capturing a video. When starting the video capture, control unit 100 may also cause touch screen unit 300 to display a live view image.

After starting the video capture, control unit 100 determines whether a predetermined image capture timing has occurred (step Sa2). The image capture timing is a timing at which a captured image is obtained to generate an avatar. The image capture timing may occur at predetermined intervals after the video capture is started, or may occur at irregular intervals.

When the image capture timing has not yet occurred (step Sa2; NO), control unit 100 continues capturing the video, without obtaining a captured image, and awaits occurrence of the image capture timing. On the other hand, when determining that the image capture timing has occurred (step Sa2: YES), control unit 100 obtains a captured image corresponding to the image capture timing based on the video being captured, which captured image is subjected to an image analysis (step Sa3). Subsequently, control unit 100 starts execution of a face analysis processing using the captured image obtained at step Sa3 (step Sa4).

Figure 8:
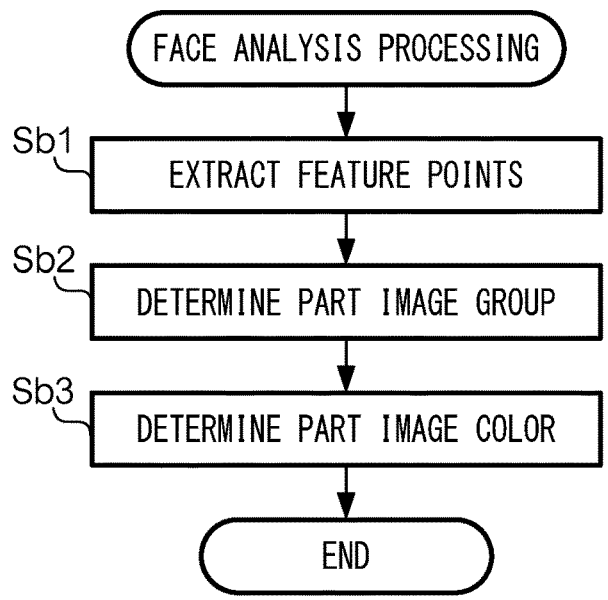
FIG. 8 shows an example of a flowchart illustrating a face analysis processing.

FIG. 8 is a flowchart showing an example of a face analysis processing. In the face analysis processing, control unit 100 extracts facial feature points from the obtained captured image (step Sb1). Plural feature points may exist for each facial part. Subsequently, control unit 100 determines groups of part images to be used in an avatar, based on the extracted feature points (step Sb2). Control unit 100 also determines a color of each part image based on the captured image (step Sb3).

Figure 9:
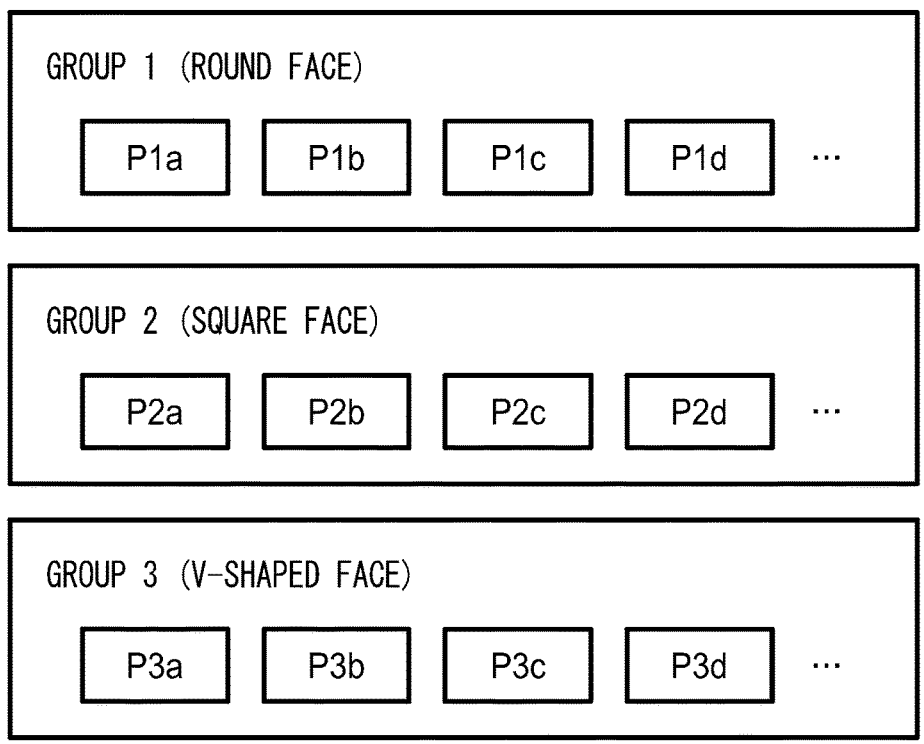
FIG. 9 shows an example of classification of part images.

FIG. 9 is a diagram showing an example classification of part images according to the present exemplary embodiment. Part images for each part according to the present exemplary embodiment are classified into groups according to a feature of the part. FIG. 9 shows an example of groups classified according to a type of face form. Round-face part images are classified into group 1, square-face part images are classified into group 2, and V-shaped-face part images are classified into group 3. Part images for the other parts are classified in a similar manner.

Part images P1a, P1b, P1c, and P1d shown in FIG. 9 belong to an identical group, which images share a feature of showing a round face, although they have different appearances. Their differences in appearance are smaller than a difference from a part image belonging to another group.

The flowchart of FIG. 8 shows only a case where control unit 100 successfully extracts feature points, for convenience of explanation; however, control unit 100 in reality may fail to extract feature points from a captured image. When having failed to extract feature points, control unit 100 may obtain another captured image corresponding to a different image capture timing to try to generate an avatar based on the captured image. Control unit 100 may alternatively notify a user of the failure to generate an avatar.

Control unit 100 awaits an end of the face analysis processing shown in FIG. 8 in the main processing shown in FIG. 7, while executing the face analysis processing. In other words, control unit 100 determines whether the face analysis processing has ended, in the main processing (step Sa5). Control unit 100 repeats the determination until the face analysis processing ends.

After the face analysis processing ends, control unit 100 retrieves part images based on an execution result of the face analysis processing (step Sa6). Control unit 100, specifically, retrieves, for each part, part images belonging to the group determined at step Sb2. Subsequently, control unit 100 combines some of the retrieved part images to generate plural, or m number of, avatars (step Sa7). The number m may be any number that is more than one, and may be set according to time intervals at which a captured image is obtained.

Figures 10, 11:
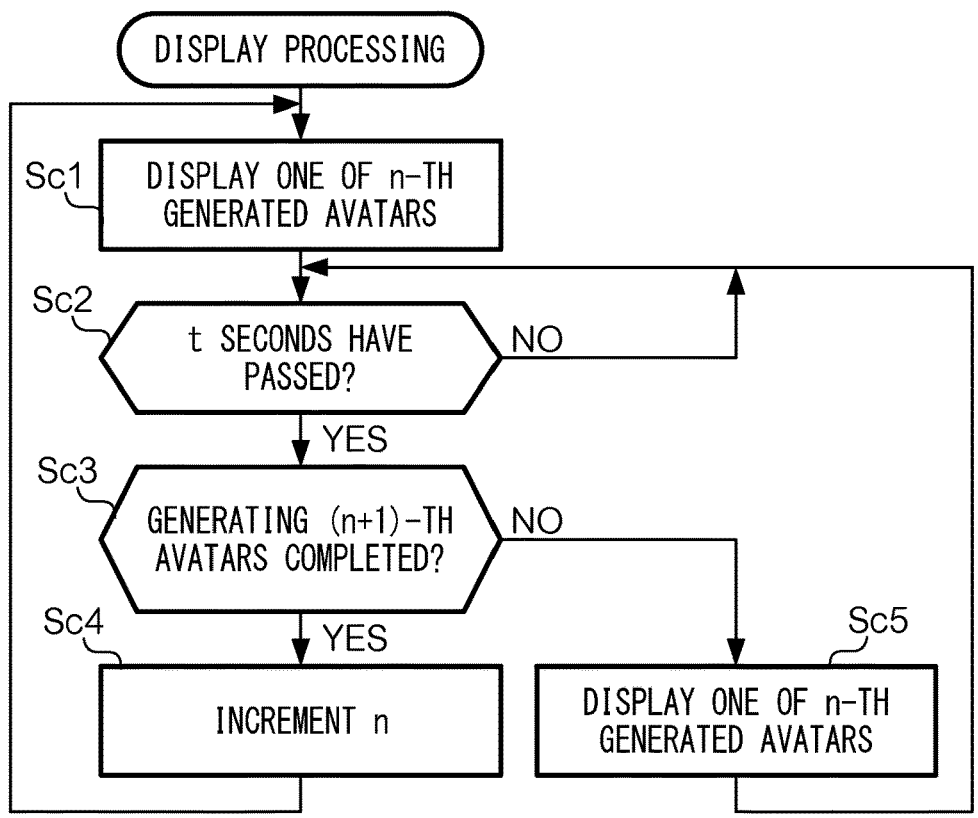
FIG. 10 shows an example of a method for generating avatars.
FIG. 11 shows an example of a flowchart illustrating a display processing.

FIG. 10 is a diagram showing a method for generating avatars according to the present exemplary embodiment. The method shown in FIG. 10 assumes for convenience of explanation that a face is formed by four types of parts including a face form, eyes, a nose, and a mouth, and that the number m is five. By the method, control unit 100 uses five different types of part images for each of the parts including a face form, eyes, a nose, and a mouth, to generate five types of avatars Av1, Av2, Av3, Av4, and Av5.

For example, avatar Av1 is formed by a combination of part images P11, P21, P31, and P41, which correspond to a face form, eyes, a nose, and a mouth, respectively. Similarly, avatar Av2 is formed by a combination of part images P12, P22, P32, and P42, which correspond to a face form, eyes, a nose, and a mouth, respectively. Avatars Av1, Av2, Av3, Av4, and Av5 are different images, although they have some similarities.

The avatars generated based on an identical captured image may share a part image between them. For example, the above avatar Av2 may include part image P11, instead of part image P12. This replacement would not make avatar Av2 identical to avatar Av1 because they still differ in parts other than a face form part.

After generating the avatars at step Sa7, control unit 100 determines whether to end generation of avatars (step Sa8). Control unit 100, for example, ends generation of avatars in response to a user's input operation to suspend the video capture, or in response to a predetermined time having elapsed subsequent to the start of the video capture. When ending generation of avatars (step Sa8: YES), control unit 100 ends the video capture (step Sa9) to end the main processing.

When not ending generation of avatars, control unit 100 continues the generation of avatars. In this case (step Sa8: NO), control unit 100 executes a processing of step Sa2 and subsequent steps again. Control unit 100, specifically, executes a processing of steps Sa2 to Sa8 each time a predetermined image capture timing occurs.

Control unit 100 repeatedly generates plural, or m number of, avatars by executing the main processing and the face analysis processing, as described in the foregoing. A timing at which an avatar is generated may deviate from a timing at which the avatar is displayed, which causes a time lag, or a delay. Control unit 100 sequentially displays avatars by executing a display processing described below.

FIG. 11 is a flowchart showing an example of a display processing. The following description of the display processing assumes that control unit 100 executes a face analysis processing and subsequent generation of avatars plural times. The following description also assumes that the number of times control unit 100 generates avatars is "n," whose initial value is "1." Control unit 100 generates m number of avatars for each generation of avatars, as described above.

In the display processing, control unit 100 starts display of one of avatars generated at n-th time (step Sc1). Subsequently, control unit 100 determines whether a predetermined time, or t seconds, has passed after execution of the processing of step Sc1 (step Sc2). The value t may be set according to an execution speed of a face analysis processing, or in view of usability. After executing the processing of step Sc1, control unit 100 suspends a subsequent processing until t seconds have passed after the avatar is displayed.

When t seconds have passed after the avatar is displayed, control unit 100 determines whether generation of avatars at (n+1)-th time has been completed (step Sc3). Control unit 100, in other words, determines whether avatars have been generated based on a captured image different from that used for n-th time generation of avatars.

When (n+1)-th time generation of avatars has been completed (step Sc3: YES), control unit 100 increments the value n (step Sc4) and thereafter executes a processing of step Sc1 and subsequent steps again. On the other hand, when (n+1)-th time generation of avatars has yet to be completed (step Sc3: NO), control unit 100 starts display of one of the avatars generated at n-th time, which has yet to be displayed (step Sc5). The avatar displayed by the processing of step Sc5 differs from the avatar displayed by the processing of step Sc1. After the avatar is displayed as a result of the processing of step Sc5, control unit 100 executes a processing of step Sc2 and subsequent steps again. Control unit 100 repeats the processing until the video capture ends.

If the processing of step Sc5 is executed (m-1) times, all of the avatars generated at n-th time will be displayed, which prevents control unit 100 from displaying a new avatar. In such a situation, control unit 100 may display again an avatar that has already been displayed, or may display the avatar with its color or a part changed.

The display processing described in the foregoing enables display of a new avatar at intervals of t seconds. The display method enables a user to view sequentially different avatars at regular intervals regardless of timings at which a captured image is obtained to generate avatars. In other words, a user would be able to view sequentially new avatars at regular intervals if the avatars are generated at irregular intervals.

2. Modifications

The above exemplary embodiment is merely an example of possible embodiments. The above exemplary embodiment is not intended for limited interpretation. The above exemplary embodiment may be modified as described below. Any two or more of the following modifications may be combined with each other.

(1) Information-processing device 10 may omit displaying a video being captured. Information-processing device 10 may, instead of capturing a video, capture a still image of a subject repeatedly at predetermined intervals, which modification enables generation of avatars similar to those generated in the above exemplary embodiment. Information-processing device 10 may repeat capturing a still image automatically, or specifically at preset intervals without waiting for a user's input operation. Information-processing device 10 may alternatively repeat capturing a still image at image capture intervals manually set by a user.

Information-processing device 10 may display only one of a video being captured and a set of avatars on a screen. Information-processing device 10 may, for example, display a list of avatars, instead of scrolling them for display. When doing so, information-processing device 10 may omit displaying a video and instead display avatars in a video display area. Information-processing device 10 may alternatively display avatars on top of a part of a video display area. Information-processing device 10 may alternatively display avatars consecutively instead of concurrently.

(2) Information-processing device 10 may or may not notify a user of image capture timings at which a captured image is obtained to generate avatars. Information-processing device 10 may make the notification by displaying a predetermined mark such as an icon on a display screen, by causing a speaker to output a sound, or by activating a vibrator. Information-processing device 10 may display a countdown counter, which counts down in seconds to a next image capture timing. Information-processing device 10 may enable a user in advance to decide whether to be notified of image capture timings.

(3) Information-processing device 10, which scrolls avatars for display, may suspend not only the scroll display but also capturing a video in response to a user's input operation. Information-processing device 10 may alternatively continue capturing a video, without suspending it, while suspending generation of avatars, in response to an input operation to suspend scroll display. Information-processing device 10 may alternatively suspend only scroll display, without suspending capturing a video or generation of avatars.

(4) An avatar according to the above exemplary embodiment may represent a whole body, instead of only a face. In such a case, information-processing device 10 may generate an image of clothes based on a captured image. Information-processing device 10 may select one of prepared images of clothes, as in the case of a part image described above. A subject represented by an avatar, according to the above exemplary embodiment may be an animal or an imaginary character. In such a case, information-processing device 10 may optimize a face analysis processing for a subject, and prepare part images for the subject. A subject according to the above exemplary embodiment may be any object that has a feature of its appearance such as a form, a size, or a length, which may lack an equivalent of a face. In such a case, information-processing device 10 may execute an analysis processing, such as pattern matching, to identify features of a subject, instead of a face analysis processing.

(5) The above exemplary embodiment may allow for omission of prepared part images. The above exemplary embodiment may replicate facial parts without using part images. A facial image may be a single piece, instead of a combination of parts.

(6) An information-processing device according to the above exemplary embodiment may be any device such as a personal computer or a game machine, instead of a smartphone such as information-processing device 10. An information-processing device according to the above exemplary embodiment may lack an image capture unit and/or a display unit, and instead include a unit for exchanging data with an image capture unit and/or a display unit. An information-processing device according to the above exemplary embodiment may lack a unit for communicating with an external device.

The above exemplary embodiment may be realized by cooperation of plural devices. The above exemplary embodiment may, for example, be realized by an information-processing system including a camera having an image capture unit, such as a still camera or a video camera, a display including a display unit, and an information-processing device including an image generation unit. An information-processing system according to the above exemplary embodiment may be formed by networked component devices, a part of which may be stationary, not portable.

The above exemplary embodiment provides not only an information-processing device but also an avatar generating method and a program for providing a computer with functions according to the above exemplary embodiment. The program may be provided to an information-processing device via a storage medium such as an optical disk or a semiconductor memory, or may be downloaded to an information-processing device via a network such as the Internet.

What is claimed is:

1. A non-transitory storage medium storing a program for causing a computer to execute a process, the process comprising:
   causing an image capture device to capture a video of a subject;
   generating plural avatars based on one image, from plural images constituting the video captured by the image capture device, the plural images corresponding respectively to different image capture timings, and each of the plural avatars representing a subject shown in at least the one image; and
   causing a display device to display the generated plural avatars and enable selection of at least one of the plural avatars.

2. The non-transitory storage medium according to claim 1, wherein generating the plural avatars comprises:
   identifying a feature of each of parts of a subject in an image constituting the video captured by the image capture device, the image corresponding to a predetermined image capture timing;
   selecting, for each of the parts of a subject, a part image according to the identified feature from among plural part images prepared for each of the parts; and
   combining the selected part images of the parts to generate an avatar.

3. The non-transitory storage medium according to claim 1, wherein generating the plural avatars comprises determining a color of at least part of an avatar based on one of the plural images.

4. The non-transitory storage medium according to claim 1, wherein causing the display device to display the generated plural avatars comprises causing the display device to display at least one of the plural avatars, together with the video being captured by the image capture device.

5. The non-transitory storage medium according to claim 1, wherein causing the display device to display the generated plural avatars comprises causing the display device to display concurrently two or more of the plural avatars.

6. The non-transitory storage medium according to claim 1, wherein:
   generating the plural avatars comprises sequentially generating an avatar in association with capturing of the video performed by the image capture device, until a predetermined condition is satisfied; and
   causing the display device to display the generated plural avatars comprises causing the display device to display the generated avatars sequentially.

7. The non-transitory storage medium according to claim 6, wherein the predetermined condition is a user's performance of a predetermined input operation.

8. The non-transitory storage medium according to claim 6, wherein causing the image capture device to capture a video comprises continuing capturing the video after the predetermined condition is satisfied.

9. The non-transitory storage medium according to claim 1, wherein generating the plural avatars comprises generating the plural avatars, the plural avatars being different from each other.

10. The non-transitory storage medium according to claim 1, wherein causing the display device to display the generated plural avatars comprises causing the display device to display an avatar at a delayed time after the avatar is generated.

11. The non-transitory storage medium according to claim 10, wherein causing the display device to display the generated plural avatars comprises causing the display device to display a generated first avatar, and thereafter to display a generated second avatar at a delayed time, the second avatar being generated subsequent to the first avatar.

12. The non-transitory storage medium according to claim 1, wherein generating the plural avatars comprises generating the plural avatars without notifying a user of the image capture timings.

13. The non-transitory storage medium according to claim 1, wherein the process further comprising:
   extracting facial feature points from the obtained captured image; and
   determining groups of part images to be used for at least one avatar based on the extracted facial feature points.

14. The non-transitory storage medium according to claim 13, wherein each group from the groups of part images corresponds to a face type for an avatar.

15. The non-transitory storage medium according to claim 13, wherein at least one avatar is formed by a combination of one or more part images.

16. The non-transitory storage medium according to claim 1, wherein the image capture device is a camera housed within a portable electronic device and the video is captured as the subject holds the portable electronic device.

17. The non-transitory storage medium according to claim 1, wherein the display device displays the video of the subject in a first portion and displays the generated plural avatars in a second portion.

18. A non-transitory storage medium for causing a computer to execute a process, the process comprising:

causing an image capture device to capture repeatedly a still image of a subject at predetermined intervals;

generating plural avatars based on one image, from plural still images captured by image capture device, each of the plural avatars representing a subject shown in at least the one image; and causing a display device to display the generated plural avatars and enable selection of at least one of the plural avatars.

19. An information-processing device, comprising:

an image capture device that captures a video of a subject;

image generation circuitry that generates plural avatars based on one image, from plural images constituting the video captured by the image capture device, the plural images corresponding respectively to different image capture timings, each of the plural avatars representing a subject shown in at least the one image; and a display device that displays the plural avatars generated by the image generation circuitry and enables selection of at least one of the plural avatars.

20. An information-processing system, comprising:

an image capture device that captures a video of a subject;

a processing system having at least one processor, the processing system configured to generate plural avatars based on one image, from plural images constituting the video captured by the image capture device, the plural images corresponding respectively to different image capture timings, each of the plural avatars representing a subject shown in at least the one image; and a display that displays the plural avatars generated by the processing system and enables selection of at least one of the plural avatars.

21. An avatar generating method, comprising:

capturing a video of a subject; and generating plural avatars based on one image, from plural images constituting the captured video, the plural images corresponding respectively to different image capture timings, each of the plural avatars representing a subject shown in at least the one image.

22. A non-transitory storage medium storing a program for causing a computer to execute a process, the process comprising:

obtaining a video of a subject from a camera;

generating plural avatars based on one image, from plural images included in the obtained video, the plural images corresponding respectively to different image capture timings, and each of the plural avatars relating to a subject shown in at least the one image;

causing a display to display the generated plural avatars and enable selection of at least one of the plural avatars; and selecting an avatar from the displayed plural avatars in response to a user's input.

* * * * *